May 19, 1970   H. SCHACKERT   3,512,861

OPTICAL FIBER SYSTEM FOR THE TRANSMISSION OF OPTICAL IMAGES

Filed March 10, 1967

HEINZ SCHACKERT
INVENTOR.

BY Karl F. Ross
Attorney

United States Patent Office 3,512,861
Patented May 19, 1970

3,512,861
**OPTICAL FIBER SYSTEM FOR THE TRANS-
MISSION OF OPTICAL IMAGES**
Heinz Schackert, Bad Kreuznach, Germany, assignor to
Jos. Schneider & Co., Bad Kreuznach, Rhineland, Germany, a corporation of Germany
Filed Mar. 10, 1967, Ser. No. 622,256
Claims priority, application Germany, Mar. 17, 1966,
Sch 38,680
Int. Cl. G02b 5/16
U.S. Cl. 350—96                                    3 Claims

ABSTRACT OF THE DISCLOSURE

System for the transmission of optical images with the aid of a bundle of light-conductive filaments, the input and output ends of these filaments being linearly juxtaposed to form at each extremity of the bundle a single row or a limited number of rows of such ends which are synchronously displaced across an image surface and a receiving surface, respectively, to reproduce the image content of the former surface on the latter. The displacement of the bundle extremities occurs, advantageously, in reciprocating (linear, rotary or composite) strokes so that the main portion of the bundle may remain stationary; differences in stroke length or a relative phase shift therebetween may be used to change the scale of the image and/or to invert, rotate or otherwise distort it (e.g. for coding purposes) in a predetermined manner.

---

My present invention relates to a method of and means for optically transmitting information from an image surface, e.g. an oscilloscope screen, a ground-glass plate or a printed sheet, to a receiving surface which may be a photosensitive film, a viewing screen or any other medium for the visualization or recording of the transmitted information.

The use of a bundle of fiber-optical elements in the transmission of such images is advantageous in any situation in which the two surfaces do not confront each other in such a manner that direct focusing of light rays from one surface upon the other by conventional projecting lenses and/or mirrors would be practical. Furthermore, the piping of light through such fibers prevents interception of the message between the transmitting and receiving stations. Also, transposition of fibers in the bundle and/or variations in their relative spacing enables the inversion or distortion of images as well as their magnification or reduction for purposes of coding, standardization, artistic effects and so forth.

In prior systems of this type, however, it was necessary to use as many light-conductive fibers in the bundle as there were discrete image elements to be transmitted, the number of these elements being determined by the desired degree of resolution of the picture or message. Thus, for example, a square surface of 20 x 20 mm. contains one million image elements if the resolution is to be 20µ.

The general object of my invention is to provide a method of and means for transmitting images with the aid of fiber-optical elements in a manner enabling the number of light-conductive fibers to be materially reduced without sacrificing any of the aforementioned advantages of such systems.

This object is realized, pursuant to my present invention, by the provision of a fiber bundle which has a flattened input end confronting an image surface and a flattened output end confronting a receiving surface, each of these flattened ends extending preferably linearly over substantially the entire associated surface in one dimension while occupying only a minor fraction of the surface in another dimension, the two ends being concurrently displaced across their respective surfaces in the last-mentioned dimension so that the entire image surface is scanned by the input end while the receiving surface is swept by the output end to recreate the original image or a modification thereof; this displacement may occur in the direction of thickness of the flattened fiber bundle or at some convenient acute angle (up to about 45°) thereto.

Advantageously, pursuant to a further feature of my invention, the displacement of the two ends of the fiber bundle occurs by a reciprocating motion, either linear or rotary, so that the intermediate portion of the bundle may remain at rest in view of the high flexibility of the filaments. These reciprocating motions, while being necessarily synchronized, may be of different amplitude if a change of image scale is desired. They may also occur with a certain relative phase shift of phase inversion if it is intended to distort or invert the received picture. Thus, the system may be used for a coding of messages and, by a complementary technique, for the subsequent decoding thereof.

Because the fiber ends move across their surfaces in a continuous sweep, resolution is no longer a problem in the dimension in which they move. (In the case of rotary motion, this dimension will be the peripheral—as distinct from radial—direction.) Thus, the number of fibers in the bundle depends only on the degree of resolutions desired in the direction perpendicular to the path of movement; in the aforestated example, with a resolution of 20µ on a surface of 20 mm. width, this number would be 1000. It is, however, possible to reduce the number of fibers even further if, pursuant to still another feature of this invention, a high-frequency transverse oscillation is superimposed upon the reciprocating or other sweep motion of the fiber ends.

The above and other features of my invention will become more fully apparent from the following description of certain embodiments, reference being made to the accompanying drawing in which:

FIG. 1 diagrammatically illustrates, in perspective view, an image-transmission system comprising a flat bundle of light-conductive fibers according to the invention;

Figure 1:
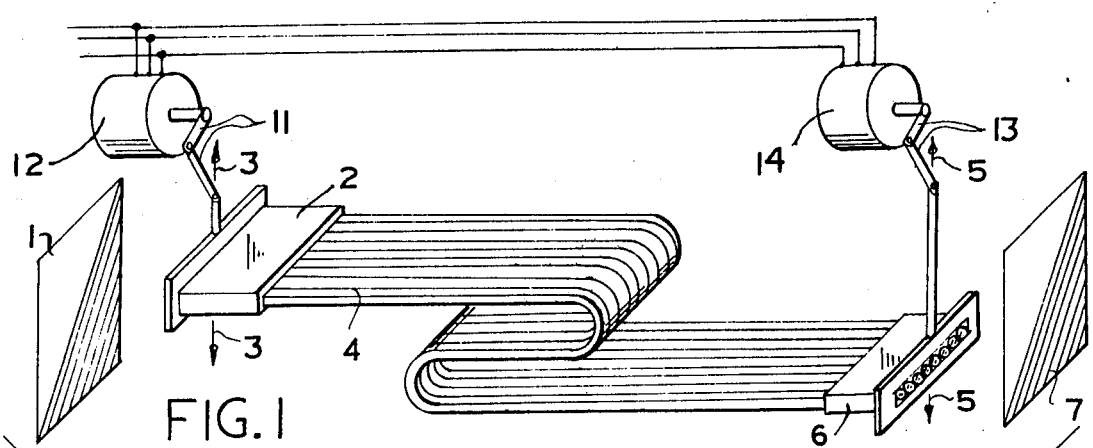

The system illustrated in FIG. 1 comprises an image surface 1 and a receiving surface 7 optically interlinked by a flat bundle 4 of the usual type of light-conductive fibers of glass or synthetic resin. Bundle 4 has an input end 2 which extends completely across surface 1 in one (here the horizontal) dimension and is reciprocable in another (here vertical) dimension, as indicated by arrow 3, with the aid of a sweep mechanism shown as a crank drive 11 powered by a motor 12. A similar sweep mechanism, comprising a crank drive 13 and a motor 14, engages the output end 6 of bundle 4 to move it across the vertical dimension of surface 7 as indicated by arrow 5. Motors 12 and 14 are synchronized and the strokes of their cranks 11 and 13 are identical so that a picture on surface 1, picked up by the input end 2 of fiber bundle 4, will be reproduced to scale on surface 7 by its illumination through the output end 6 of that bundle. If surface 7 is a photosensitive film or the like, the speed or drives 11 and 13 is not critical (assuming the image on surface 1 to be stationary) and a single sweep may suffice for the reproduction; if the reproduced image is to be observed visually, the sweep should be rapid and repeated within the limits of retentiveness of the human retina, similar to the frame scan of a television picture. If surface 7 is part of a motion-picture film, the change of frames should, of course, occur between the sweeps.

If it were desired to invert the picture appearing on surface 7, the fibers in bundle 4 could be crossed over between the two ends 2 and 6 while the cranks 11 and 13 are placed in diametrically opposite positions so as to operate 180° out of phase.

For a change of scale in the vertical dimension, the effective length of cranks 11 and 13 should be different; in the horizontal dimension, a scale change can be brought about by a spreading or bunching of the fibers at output end 6 relative to input end 2.

Figure 2:
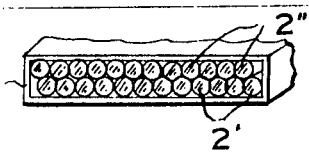
FIG. 2 is a perspective end view of a modification of the fiber bundle of FIG. 1.

In FIG. 2 I have shown a modified input end 2a of bundle 4 constituted by two closely adjacent rows of fiber ends 2′ and 2″, these rows being relatively staggered by one fiber radius to insure continuity of pickup over the entire width of the image surface. It will be understood that the corresponding output end 6 (FIG. 1) should be laid out in the same manner but that the relative position of the fibers between these two ends is immaterial.

Figure 3:
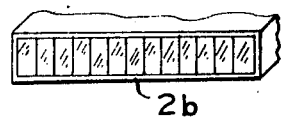
FIG. 3 is a view similar to FIG. 2 illustrating another modification.

In FIG. 3 I show another modification 2b of the input end of the fiber bundle with the extremities of its filaments deformed into rectangular shape, these extremities contacting one another along adjoining sides of their squares so as to provide again a continuous pickup without the need for having more than one row of fibers.

Figure 4:
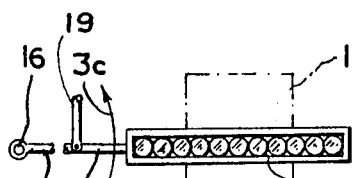
FIGS. 4–11 are diagrammatic views showing different groupings of fibers and various modes of displacement thereof adapted to be used in the system of FIG. 1.

FIG. 4 shows the input end 2c mounted on the end of a swingable arm 15 which oscillates about a fulcrum 16 as indicated by arrow 3c.

Figure 5:
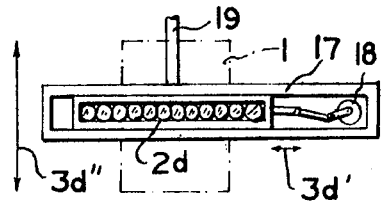

In FIG. 5 the input end 2d is horizontally slidable in a frame 17 under the control of a drive mechanism 18 imparting high-frequency oscillations to the fiber bundle, as indicated by arrow 3d′, in contradistinction to the relatively slow large-amplitude oscillations (arrow 3d″) which the assembly experiences by virtue of a mounting of frame 17 on an arm 19 leading to the crank 11 of FIG. 1. The transverse oscillation (with reference to the crank-controlled sweep) produced by drive means 18 should have a minimum amplitude of about one fiber diameter and a frequency of at least $n$ cycles per sweep where $n$ is the number of fibers in the bundle.

Figure 6:
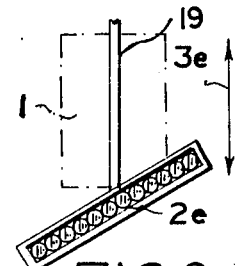

In FIG. 6 the input end 2e, reciprocating vertically as indicated by arrow 3e, is inclined with reference to the horizontal so that its sweep occurs at other than right angles to its principal dimension. Also in this case, however, the width of the bundle in the direction of its sweep is only a small fraction of the corresponding dimension of the confronting surface 1.

Figure 7:
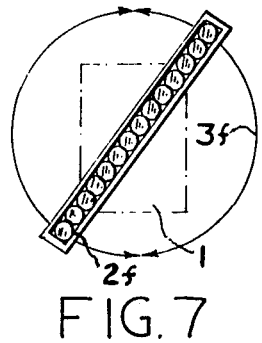

FIG. 7 shows the possibility of rotating the input end of a fiber bundle 2f about the center of surface 1 as indicated by arrows 3f.

Figure 8:
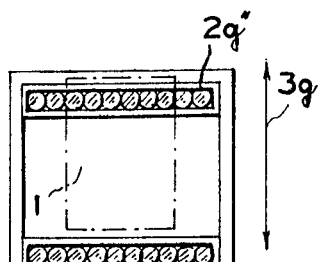

FIG. 8 shows the possibility of concurrently displacing two transversely spaced fiber arrays 2g′, 2g″, mounted in a common frame 20, as indicated by arrow 3g.

Figure 9:
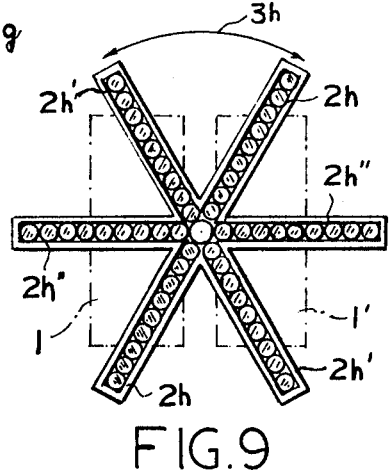

FIG. 9 shows a set of fiber arrays 2h, 2h′, 2h″ angularly intersecting one another with 60° spacing, the center of rotation (arrow 3h) being here offset from surface 1 in contradistinction to the arrangement of FIG. 7. The fiber arrays here need not oscillate through an angle greater than 60°. This arrangement can also be used to scan a second surface 1′.

Figure 10:
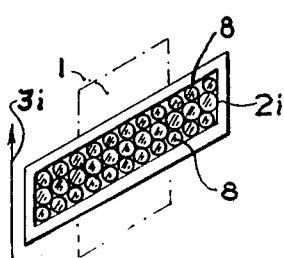

FIG. 10 shows an array of fiber ends 2i juxtaposed with extremities of other filaments 8 whose opposite ends are illuminated from a source not shown, the entire assembly being reciprocable across surface 1 as indicated by arrow 3i. This arrangement is particularly useful where surface 1 is not luminous so that it has to be lit by incident radiation here supplied by the filaments 8.

Figure 11:
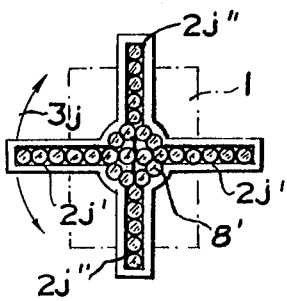

In FIG. 11, finally, I show two intersecting arrays of fiber ends 2j′ and 2j″, similar to the arrangement of FIG. 9 (but with an angular spacing of 90°); their reciprocating sweep has been indicated by arrow 3j. Illuminating filaments 8′ are clustered about the intersection and center of rotation of the two rows of fibers 2j′ and 2j″.

Naturally, the various types of motion and relative positioning of the image-transmitting fibers shown in each of FIGS. 3–11 should also be duplicated, with the possible exceptions noted above, on both ends of the filament bundle, yet the illuminating fibers 8, 8′ illustrated in FIGS. 10 and 11 are to be omitted at the output end where they would only interfere with the reproduction of the message. The motors 12, 14, 18 are to be considered as representative of any type of conventional mechanical, electromechanical, magnetic, hydraulic or pneumatic means capable of imparting the desired displacement to the associated fiber ends; in some cases the fibers may also be moved by hand.

Features shown in FIGS. 2–11 may be combined or interchanged, within the limits of compatibility, without departing from the spirit and scope of my invention.

I claim:

1. A system for the transmission of optical images, comprising means forming an image surface; means forming a receiving surface remote from said image surface; a bundle of light-conductive fibers disposed between said surfaces, said bundle having a flattened input end adjacent said image surface and a flattened output end adjacent said receiving surface, each of said flattened ends extending substantially entirely over the respective surface in one dimension while occupying only a minor fraction of the surface in a direction perpendicular thereto; a pair of elongate guide elements slidably engaging said flattened input and output ends, respectively, while extending in said one dimension of the respective surface; and mechanism coupled with said input and output ends for concurrently displacing same across their respective surfaces, said mechanism including synchronized but mutually independent first and second main oscillatory drives respectively engaging said guide elements for moving same in said perpendicular direction and first and second ancillary oscillatory drives on said guide elements engaging the respective fiber ends for superimposing transverse oscillations of substantially higher frequency upon the motion of said fiber ends due to said main oscillatory drives, said bundle being flexible and of such length that its midportion remains substantially stationary as said ends are oscillated.

2. A system as defined in claim 1 wherein said main drives have different stroke lengths in said perpendicular direction.

3. A system as defined in claim 1 wherein said main drives are relatively dephased.

References Cited

UNITED STATES PATENTS

| | | | |
|---|---|---|---|
| 3,204,543 | 9/1965 | O'Keeffe | 350—96 X |
| 2,939,362 | 6/1960 | Cole | 350—96 X |
| 3,016,785 | 1/1962 | Kapany | 350—96 |
| 3,125,013 | 3/1964 | Herrick et al. | 350—96 X |
| 3,125,812 | 3/1964 | Simpson | 350—96 X |
| 3,192,843 | 7/1965 | Kapany et al. | 350—96 X |
| 3,194,142 | 7/1965 | Black | 350—96 X |
| 3,238,837 | 3/1966 | Woodcock | 350—96 |

DAVID H. RUBIN, Primary Examiner

U.S. Cl. X.R.
355—1